(No Model.)
T. S. FAIR.
HAND CORN PLANTER.
No. 592,489. Patented Oct. 26, 1897.
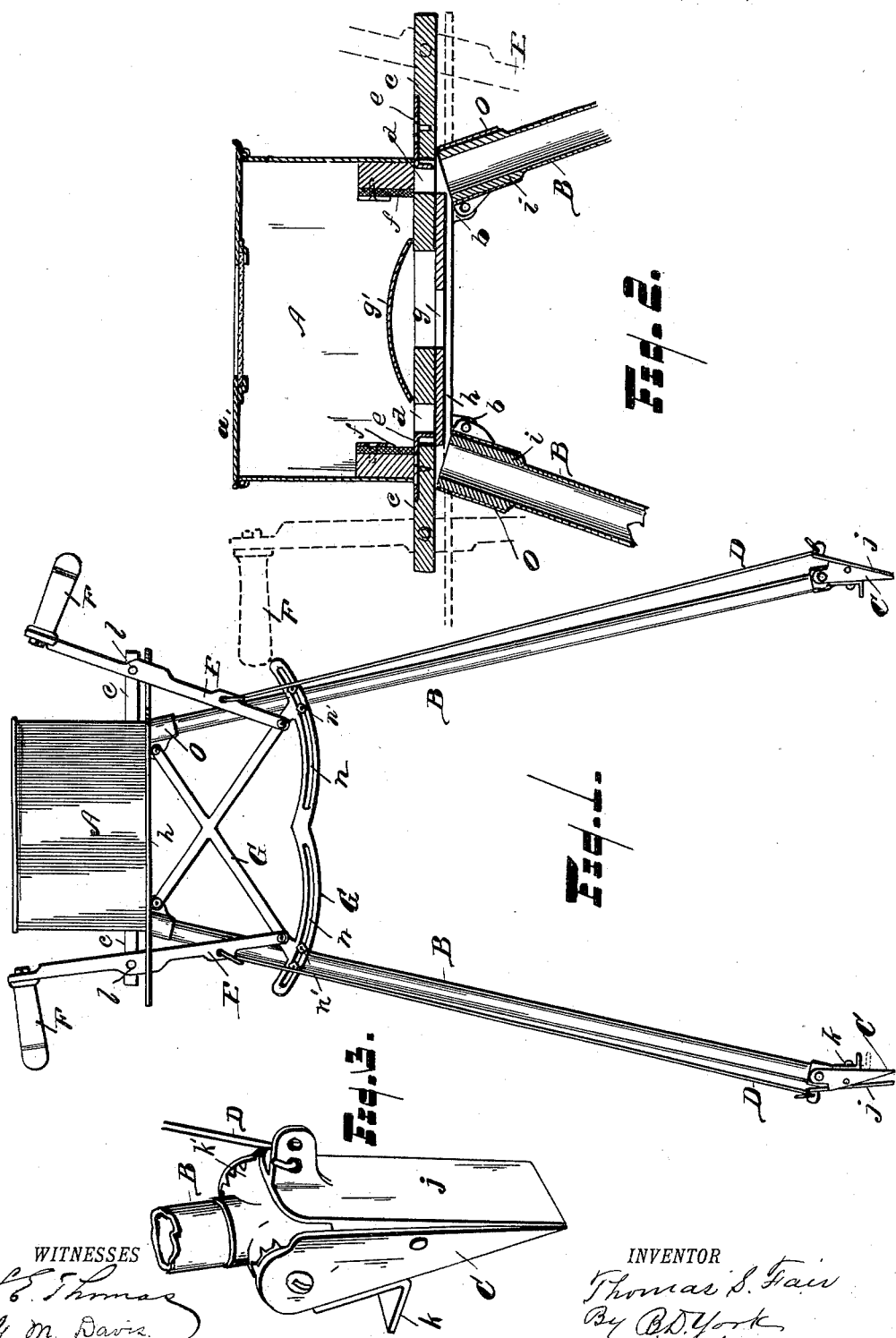
WITNESSES
INVENTOR
Thomas S. Fair
By B. D. York
his Attorney

UNITED STATES PATENT OFFICE.

THOMAS S. FAIR, OF DETROIT, MICHIGAN.

HAND CORN-PLANTER.

SPECIFICATION forming part of Letters Patent No. 592,489, dated October 26, 1897.

Application filed June 24, 1897. Serial No. 642,048. (No model.)

*To all whom it may concern:*

Be it known that I, THOMAS S. FAIR, a citizen of the United States, residing at Detroit, in the county of Wayne and State of Michigan, have invented new and useful Improvements in Hand Corn-Planters; and I declare the following to be a full, clear, and exact description of the invention, such as will enable others skilled in the art to which it pertains to make and use the same, reference being had to the accompanying drawings, which form a part of this specification.

My invention relates to improvements in apparatus or machines for planting corn or other seeds; and the object of my invention is to produce a machine that can be operated by hand by one person and plant two rows of corn or other seed at once, and which shall be inexpensive, light, strong, and simple in construction.

With these and other objects in view my invention consists of a mechanism illustrated in the accompanying drawings, in which—

Figure 1 is a side elevation of the complete machine. Fig. 2 is a sectional view showing the interior construction of the hopper and the upper part of the conducting-tubes. Fig. 3 is an enlarged view of the planting-points.

Similar letters refer to similar parts throughout the several views.

The hopper or grain-box A has its sides and top made of tin, galvanized iron, or other suitable material and is constructed with the sliding cover $a$, in which is set a piece of common window-glass to enable the operator to readily inform himself as to the amount of corn or seed in the hopper. In the bottom of the hopper, which is made of wood, are arranged the feed bars or slides $c\,c$. These feed-bars fit loosely in a trough in the bottom of the hopper and have the openings $d\,d$, into which the corn or grain drops and is carried by reciprocating motion of the bars to the tubes, as hereinafter more fully explained. The slides $e\,e$ are for the purpose of varying the size of the openings $d$ in the seed bars or slides $c\,c$ to regulate the amount of seed to be sown. As the feed-bars are made to reciprocate the openings $d\,d$ are brought under the cut-offs $f\,f$, so that only the amount of corn or other seed contained in the openings $d\,d$ will be carried to and dropped into the tubes at one time.

In the center of the hopper-bottom is the opening $g$, covered with the curved shield $g'$, made of some suitable material, the said opening being for the purpose of allowing chaff or other refuse that may get into the hopper to pass out and not interfere with the operation of the machine.

The hopper A, constructed as above described, is mounted on the light-metal frame $h$, provided with the brackets $b\,b$, to which are hinged the two tubes B B, made of light sheet metal, and which tubes are for the purpose of conducting the corn or other seed from the hopper to the planting-points C C, attached to the tubes, hereinafter more fully described. The upper ends of the tubes B B are provided with the cast-metal collars $i$ to form a substantial connection with the hopper, as plainly shown in the drawings.

The planting-points C C are made of cast metal of a wedge-shaped form, three sides of which are cast in a single piece. The fourth side, consisting of the doors $j$, is hinged to the other part near the center, as shown. These doors are normally held closed by a wire spring of any approved form and are arranged to be opened by the tripping-rods D, attached to the said doors and to the levers E, as shown in Fig. 1 of the drawings.

Adjustable metal brackets $k$ are attached to the planting-points, on the inside thereof, for the purpose of preventing the points from entering too far into the soil when working the loose ground. The planting-points are attached to the serrated ends of hubs $k'$, secured to the lower ends of the tubes B B, and the plates of the points are provided with a single tooth on two sides, as shown in Fig. 3, which arrangement allows these points to be set at right angles with the surface of the ground and allows the angle or spread of the tubes B B to be varied.

F F are handles made of wood or other suitable material, and are used to move the machine and also to operate the levers E E, to which they, F, are attached. The lower ends of the levers E E are loosely pivoted to the bracing-frame G and near their middle are attached to the seed slides or bars $c\,c$ by means of a pin $l$, upon which pin the lever plays and is allowed to work freely in slots arranged for that purpose in the frame $h$, this arrangement of parts allowing the oscillating motion of the levers and reciprocation of the feed-bars necessary to carry the grain in the required amounts and at the proper intervals to the tubes B B.

The tripping-rods D D are made of wire of suitable size, one end being attached to the levers E E and the other end to the doors of the planting-points, as shown.

The brace G is of cast metal, preferably of the form shown, and provided with the slot $n$, allowing for the variation of the angle or spread of the tubes B B, which can be made more or less, and thus be adapted to rows of greater or less distance apart. The upper end of the brace is fastened to the frame $h$ with the same screws as the tubes B B, and the lower end is fastened to the tubes with U-shaped clips $n'$, partly encircling the tubes, the open ends of the clips passing through the slots and fastened with nuts.

The upper ends of the tubes B B are provided with the light-metal collars $o$ for the purpose of closing any opening that might be made in extending the spread of the tubes by simply slipping the collars close to the hopper.

In the drawings, Fig. 1 shows simply for the purpose of illustration one side of the machine as it appears open ready for the corn or seed to be dropped into the ground and the other side closed.

It will be readily understood from the above description and the drawings that the invention is so arranged that when in use the parts do not interfere with the free movement of the person operating the same, and that the two rows can be planted at once; also, that the machine can easily and quickly be taken apart, in which condition it requires very little room, which is a great advantage in shipping and storage.

While I have described a planter with only two tubes and for two rows at once, it will readily be seen that by making slight changes and additions the invention can be adapted to the use of more than two tubes and planting-points if desirable or necessary.

What I claim is—

1. A hand-planter comprising a central hopper, seed-conducting tubes extending downwardly therefrom and provided at their lower ends with planting-points, seed bars or valves controlling the exit of seed from the hopper to the tubes, and handles or levers at opposite sides of the hopper and connected with the seed bars or valves and with the movable members of the planting-points, substantially as described.

2. The combination in a hand-planter, with the central hopper and the conducting-tubes leading down from opposite sides thereof, of horizontal bars or valves extending through opposite sides of the hopper and controlling the exit of seed to the conducting-tubes and vertically-extending hand-levers pivoted at opposite sides of the hopper and pivotally connected to the respective seed-dropping bars or valves, substantially as described.

3. The combination in a hand-planter with the central hopper having the depending seed-conducting tubes and a valve mechanism for delivering seed into each of said tubes, of hand-levers at opposite sides of the hopper and operatively connected with said valve mechanisms, substantially as described.

4. A hand corn-planter comprising, a central hopper, seed-conducting tubes depending therefrom and terminating at their lower ends in planting-points provided with doors, seed-bars extending through opposite sides of the hopper and controlling the exit of seed from the hopper to the tubes, vertically-extending hand-levers pivoted below the seed bars or slides and connected at their middle portions to the outer ends of the seed-bars, and wires or rods connecting the levers below the seed-bars with the doors of the planting-points, substantially as described.

5. The combination with the hopper, its valves and hand-levers, of the hinged conducting-tubes and the collars $o$ $o$ sliding on the hinged ends of the tubes to close any opening between the tubes and hopper due to the adjustment of the former, substantially as described.

6. The combination with the conducting-tube having serrations at its lower end, of a planting-point adjustable at an angle to the tube and having a tooth to engage said serrations, substantially as described.

7. The combination with the seed-dropping mechanism and the depending conducting-tubes having serrations at opposite sides of their lower ends, of planting-points having inwardly-extending teeth at opposite sides of their upper ends to interlock with the serrations and hold the points at any desired angle, substantially as described.

8. The combination with the conducting-tube having a transverse hub or its lower end provided with serrated ends, of a planting-point embracing said hub with its upper end and there provided with teeth engaging said serrations, and retaining-screws, substantially as described.

9. A hand-planter comprising a hopper, having opposite outlets, a frame on which the hopper is mounted, lugs or brackets on the under side of the frame adjacent to said hopper-outlets, a depending brace having its lower portion provided with curved slots, seed-bars sliding through opposite sides of the hopper and feeding the seed to said outlets, conducting-tubes hinged to said lugs or brackets and provided with adjusting bolts or clips extending through said curved slots and having retaining-nuts, planting-points on the lower ends of the tubes and provided with pivoted doors, hand-levers pivoted at their lower ends to the brace and at their middle portions pivoted to the seed-bars, and rods connecting said levers with said pivoted doors, substantially as described.

10. The combination with the seed-hopper having in its bottom a central opening $g$ and an overlying shield $g'$; seed-outlets being provided at opposite sides of the hopper-bottom and cut-offs above the outlets, of opposite, sliding seed-bars extending through the sides of the hopper with their inner ends under said shield, openings $d$ being formed through the seed-bars, and means for reciprocating said bars, substantially as described.

11. The combination with the hopper, its seed-bars and the opposite hand-levers connected to the seed-bars, of the conducting-tubes provided at their lower ends with planting-points adjustable at an angle to the tubes and provided with doors operatively connected to said hand-levers, substantially as described.

12. A seed-tube for hand-planters provided at its lower end with a planting-point adjustable at an angle to the tube whereby the point may be always perpendicular regardless of the inclination of the tube, substantially as described.

THOS. S. FAIR.

Witnesses:
L. S. LERCH,
H. P. STRONG.